United States Patent
Baity

(10) Patent No.: US 12,151,801 B2
(45) Date of Patent: Nov. 26, 2024

(54) FLIGHT CONTROL ARRANGEMENT USING SEPARATE FIXED-WING AND VTOL CONTROL MODULES

(71) Applicant: Textron Systems Corporation, Hunt Valley, MD (US)

(72) Inventor: Sean Marshall Baity, Westminster, MD (US)

(73) Assignee: Textron Systems Corporation, Hunt Valley, MD (US)

( * ) Notice: Subject to any disclaimer, the term of this patent is extended or adjusted under 35 U.S.C. 154(b) by 293 days.

(21) Appl. No.: 17/212,146

(22) Filed: Mar. 25, 2021

(65) Prior Publication Data
US 2022/0306294 A1    Sep. 29, 2022

(51) Int. Cl.
*B64C 13/02*     (2006.01)
*B64D 45/00*     (2006.01)
(Continued)

(52) U.S. Cl.
CPC .............. *B64C 13/02* (2013.01); *B64D 45/00* (2013.01); *B64U 10/20* (2023.01); *G05D 1/101* (2013.01);
(Continued)

(58) Field of Classification Search
CPC ....... B64C 39/024; B64C 13/02; B64C 29/00; B64D 45/00; B64U 10/00; B64U 30/20;
(Continued)

(56) References Cited

U.S. PATENT DOCUMENTS

| 7,159,817 B2 | 1/2007 | Vandermey et al. |
| 9,932,108 B1 | 4/2018 | Viele |

(Continued)

FOREIGN PATENT DOCUMENTS

| EP | 3557358 A1 | 10/2019 |
| EP | 3738872 A1 | 11/2020 |

OTHER PUBLICATIONS

Lorenz, et al.; "PX4: A Node-Based Multithreaded Open Source Robotics Framework for Deeply Embedded Platforms," 2015 IEEE International Conference on Robotics and Automation (ICRA), IEEE, May 26, 2015, pp. 6235-6240.

*Primary Examiner* — Marc Burgess
*Assistant Examiner* — John D Holman
(74) *Attorney, Agent, or Firm* — BainwoodHuang

(57) ABSTRACT

A flight control arrangement for a hybrid aircraft includes a fixed-wing flight (F/W) control module and vertical takeoff/landing flight (VTOL) control module. The F/W control module is an integrated component having a respective network interface connected to an aircraft data network via which it provides fixed-wing control output to network-connected fixed-wing flight components including one or more horizontal-thrust components. The VTOL control module is also an integrated component having a respective network interface to the aircraft data network via which the VTOL control module (1) observes flight status as reflected in network messages originated by the fixed-wing flight control module, and (2) based on the observed flight status, generates VTOL control output to network-connected VTOL flight components including one or more vertical-thrust components, to control VTOL flight as well as transitions to and from fixed-wing flight.

19 Claims, 4 Drawing Sheets

(51) Int. Cl.
  *B64U 10/20* (2023.01)
  *G05D 1/00* (2024.01)
  *G08G 5/00* (2006.01)
  *B64U 10/25* (2023.01)
  *B64U 30/20* (2023.01)
  *B64U 50/13* (2023.01)
  *B64U 70/30* (2023.01)

(52) U.S. Cl.
  CPC ......... *G08G 5/0008* (2013.01); *G08G 5/0013* (2013.01); *B64U 10/25* (2023.01); *B64U 30/20* (2023.01); *B64U 50/13* (2023.01); *B64U 70/30* (2023.01); *B64U 2201/10* (2023.01)

(58) Field of Classification Search
  CPC .... B64U 2201/10; G05D 1/0858; G05D 1/10; G08G 5/0008; G08G 5/0013
  USPC .......................................................... 701/11
  See application file for complete search history.

(56) References Cited

U.S. PATENT DOCUMENTS

| | | | |
|---|---|---|---|
| 10,382,225 B2 | 8/2019 | Dormiani et al. | |
| 11,472,568 B2* | 10/2022 | Schwartz | G06N 3/02 |
| 2006/0151666 A1 | 7/2006 | Vandermey et al. | |
| 2015/0115096 A1* | 4/2015 | Rossi | B64D 5/00 244/2 |
| 2016/0031554 A1 | 2/2016 | Eshkenazy et al. | |
| 2016/0297520 A1* | 10/2016 | Sada-Salinas | B64D 27/24 |
| 2017/0158325 A1* | 6/2017 | Chen | G05D 1/0858 |
| 2018/0155021 A1 | 6/2018 | Patterson et al. | |
| 2018/0327091 A1 | 11/2018 | Burks et al. | |
| 2019/0329882 A1* | 10/2019 | Baity | B64C 29/0033 |
| 2020/0287619 A1* | 9/2020 | Tavner | G05D 1/101 |
| 2021/0171187 A1 | 6/2021 | Keir | |

* cited by examiner

FLIGHT CONTROL ARRANGEMENT USING SEPARATE FIXED-WING AND VTOL CONTROL MODULES

BACKGROUND

This invention is generally in the field of aerospace, and relates specifically to flight control of fixed wing aircraft equipped with multi-rotor vertical take-off and landing (VTOL) capability.

SUMMARY

A flight control arrangement for a hybrid aircraft includes a fixed-wing (F/W) flight control module and vertical take-off/landing flight (VTOL) control module. The F/W control module is an integrated component fully capable of independently controlling F/W flight, and it has a respective network interface connected to an aircraft data network via which it provides fixed-wing control output to network-connected fixed-wing flight components including one or more horizontal-thrust components. The VTOL control module is also an integrated component and has a respective network interface to the aircraft data network via which the VTOL control module (1) passively observes flight status as reflected in network messages originated by the fixed-wing flight control module, and (2) based on the observed flight status, generates VTOL control output to network-connected VTOL flight components including one or more vertical-thrust components, to control VTOL flight as well as transitions to and from fixed-wing flight, which is executed by the F/W controller without logical or supervisory control of the VTOL controller functions.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1:
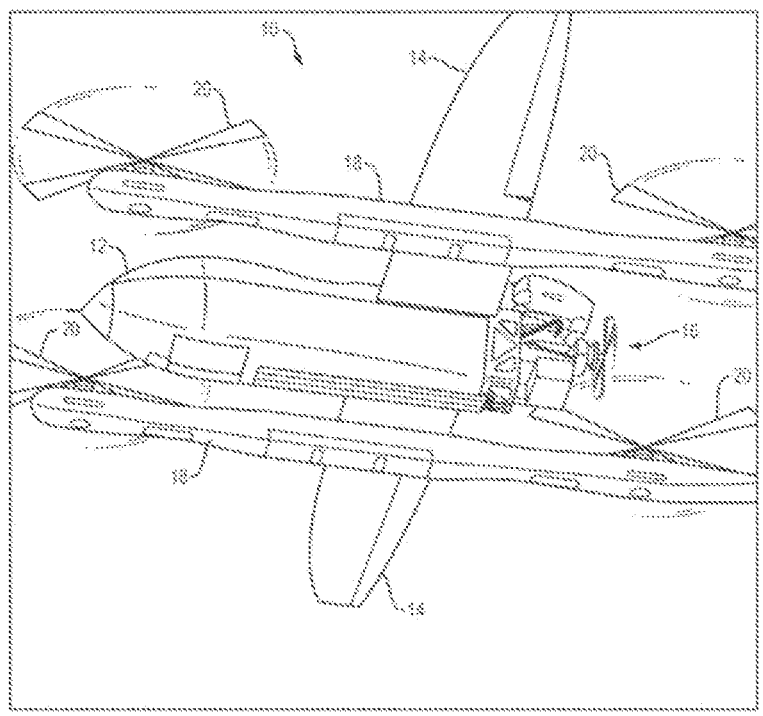
FIG. 1 is an isometric view of a hybrid aircraft.

In certain operating scenarios for fixed-wing aircraft, including unmanned "drone" aircraft as generally known, transition to/from fixed wing flight has been accomplished via rolling take-off/landing or using energetic assistance through catapult/launcher with recovery performed on runway, net, or other capture device. Hybrid solutions with separated lift and thrust capabilities (quad-planes) have emerged as a means to provide runway independence and enable point take-off and recovery without the need for supplemental ground support equipment. These hybrid systems leverage multi-rotor lifting capability to lift/recover fixed wing aircraft by enabling transition to/from fixed wing flight.

Prior methods of implementing flight control for such hybrid aircraft required implementing unique hybrid quadrotor software code applied as part of an integrated device (autopilot). While the implementation approach has differed in levels of architectural modularity within these devices, prior methods involved singular autopilot device solutions that were closely coupled with defined quad-plane aircraft characterization, sensing and inner/outer loop controls to provide VTOL, transition, and fixed wing flight.

A presently disclosed technique augments a fixed wing aircraft flight control and management solution to enable vertical take-off and landing capability without modification to the existing fixed wing controller. The system utilizes a federated VTOL flight controller loosely coupled with the fixed wing controller via an aircraft network and distributed interface modules. The VTOL flight controller provides for transition to and from fixed wing flight by asserting control to VTOL lift propulsion systems based upon fixed wing control and aircraft configuration parameters. During fixed wing flight, the VTOL controller is maintained in a quiescent state. The VTOL flight controller asserts control based upon high level observable state/mode and other criteria of the fixed wing controller, while remaining loosely coupled to the fixed wing controller via a network interface.

The F/W controller operates as an independent agent without knowledge of the presence and involvement of the VTOL controller beyond indirect inertial observations (i.e. inertial sensors perceive VTOL motion but F/W controller has no logical understanding or relationship). In effect, the F/W controller is simply flying a F/W aircraft in a conventional manner, while the VTOL controller is the steward of entering and transitioning to/from viable fixed wing flight regimes.

More particularly, the disclosed technique may be differentiated from known aircraft control arrangements by one or more of the following:

1. Vertical take-off and landing controller that is loosely coupled to an unmodified fixed wing flight and mission controller. As add-on functionality, the VTOL controller monitors and acts upon fixed wing controller states, modes, and observable/sensors reporting. The fixed wing controller is unmodified from traditional fixed wing aircraft configurations. Solution, enables field retrofit of existing fixed wing assets (or uniquely configured hybrid-quad solutions).

2. Physically separated, functionally federated, and networked modules. Technique can leverage existing interface modules to adapt and integrate using software defined routing throughout the aircraft. Different than integrated solutions (e.g., Printed Circuit Assemblies like the Piccolo™, or controllers such as Athena™, MicroPilot™, or PixHawk™) since the core flight functionality is physically separated using networked interfaces. The technique can reduce the complexity of physical aircraft integration and provide software defined routing of flight control signals throughout the aircraft without physical harness modification. The method also can eliminate the complexity and cost to modify and/or re-qualify flight critical legacy components that lack the ability to address capability injection resulting from technical or industrial obsolescence or dependence on proprietary interfaces or functions.

3. Low throughput, distributed interface, vehicle wide connectivity using CANbus, using less than 1 Mbps bandwidth. May be more resilient for distributed vehicle integrations in contrast to typical System on Chip or single device implementations such as SPI or I2C. Also contrasts with 10/100/1000 Mbps Ethernet which increases SWaP and complexity.

Description of Embodiments

FIG. 1 shows an unmanned aircraft system (UAS) 10, also referred to as an unmanned aerial vehicle (UAV). The basic structure is that of a fixed-wing (F/W) aircraft having an elongated fuselage 12 and fixed wings 14, with propulsion provided by a rear-mounted engine and propeller 16 for horizontal fixed-wing flight. The UAS 10 is also configured for vertical takeoff and landing (VTOL) through the use of booms 18, each attached to the underside of a respective wing 14 and carrying respective upward-facing rotors 20. The rotors 20 are powered by respective small engines/motors within the booms 18, not visible in this view. With the addition of the VTOL structure and capability as described, the UAS 10 may be referred to as a "hybrid" UAS 10. Another term that is commonly used is "hybrid-quad", referring to the use of four VTOL rotors 20.

In operation, the UAS 10 is launched vertically, typically from a ground position, then flown in a conventional fixed-wing manner, and then landed, which may be a vertical landing. During launch and landing, the rotors 20 are used to provide vertical thrust and horizontal translation, while the engine and propeller 16 are either inactive, actively assisting longitudinal translation, or at idle. During fixed-wing flight, the engine and propeller 16 provide horizontal thrust, and the VTOL rotors 20 are inactive. Although the booms 18 represent undesirable weight and drag for fixed-wing flight, there are applications in which this drawback is outweighed by the desired VTOL capability.

In one embodiment the rotors 20 have fixed upward orientation, while in alternative embodiments some or all rotors 20 may be articulable in one or more directions, e.g., about a roll axis and/or pitch axis.

Figure 2:
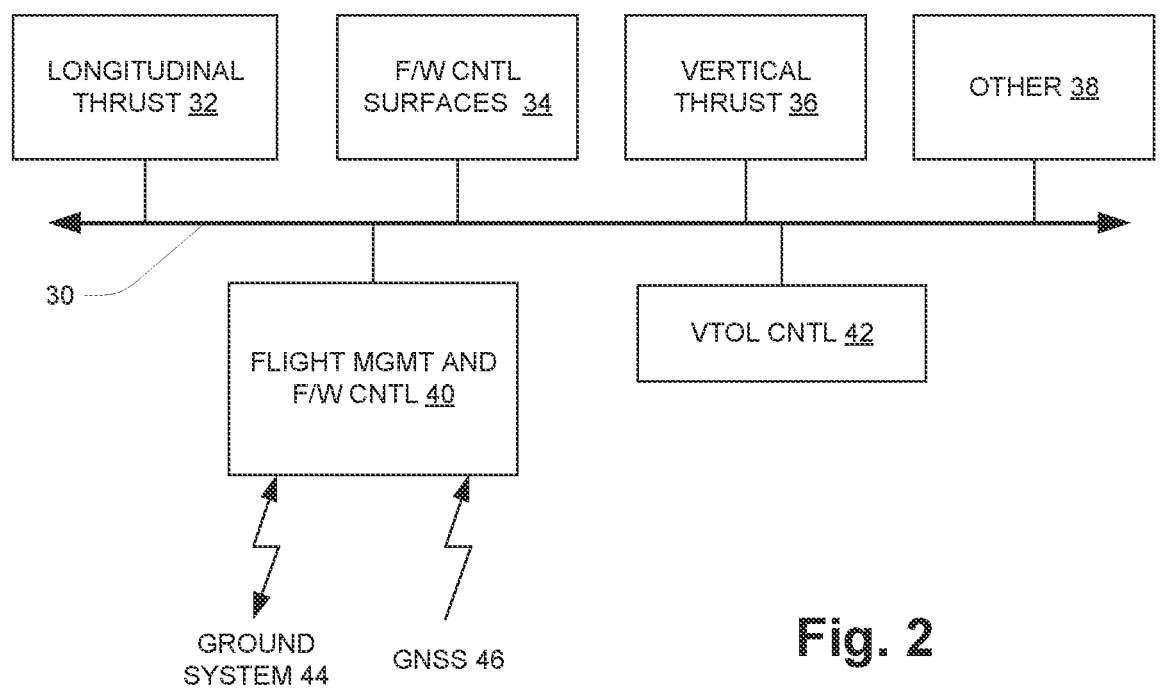
FIG. 2 is a schematic diagram of a control arrangement for the aircraft.

FIG. 2 illustrates certain components of the aircraft 10 in schematic form, in particular in relation to an aircraft network 30 used within the aircraft 10 to convey operating commands and data among the components. The components include longitudinal (horizontal) thrust components 32 (e.g., engine and propeller 16), fixed wing control surfaces 34, vertical thrust components 36 (e.g., VTOL rotors 20), and Other functional components 38, examples of which are given below. Additionally, the arrangement includes a flight management and fixed-wing control module 40 and a separate VTOL control module 42. The flight management and F/W control module 40, also referred to herein as the F/W control module 40, has external communications links to a ground system 44 and to a global navigation satellite system (GNSS) 46. Generally in operation, the F/W control module 40 serves as the overall flight controller and in particular as the controller for fixed-wing flight, thus providing control commands and data to the longitudinal/horizontal thrust components 32 and F/W control surfaces 34. In one embodiment, the F/W control module 40 may be realized using a Piccolo™ autopilot module, which is a separately housed component with integrated flight control functionality. The VTOL control module 42 serves as the controller for VTOL flight, providing control commands and data to the vertical thrust components 36. The VTOL control module 42 may likewise be separately housed, and it incorporates integrated VTOL control functionality as described herein.

In one embodiment the aircraft network 30 may be realized as a collection of one or more physical networks, some or all of which may utilize the so-called CAN Bus (Controller Area Network Bus) standard. In the present description, the acronym CAN is used to refer to one of these physical buses.

The Other functional components 38 generally include components of a variety of types, including aircraft power system components (e.g., generators, batteries, distribution), payload/mission-related components (e.g., weapon), network-connected sensors, transponder/IFF, navigation/anti-collision lighting, etc. Details of the flight management and F/W control module 40 and VTOL control module 42 in illustrative embodiments are provided below.

The VTOL control module 42 augments the F/W flight control of the F/W control module 40 to independently manage VTOL and transitions. Aircraft control is exchanged between the loosely coupled F/W control module 40 and the VTOL control module 42 based on state/mode transitions of the F/W control module 40, as described more below. The CANbus architecture provides access to the VTOL control module 42, which has its own dedicated IMU in at least one embodiment. In operation, a fixed wing waypoint launch and landing plan may be used that is unmodified from standard fixed wing operations/logic. Standard Flight Status Utility (FSU) widgets can be used at the ground controller to facilitate the VTOL augmentation.

Figure 3:
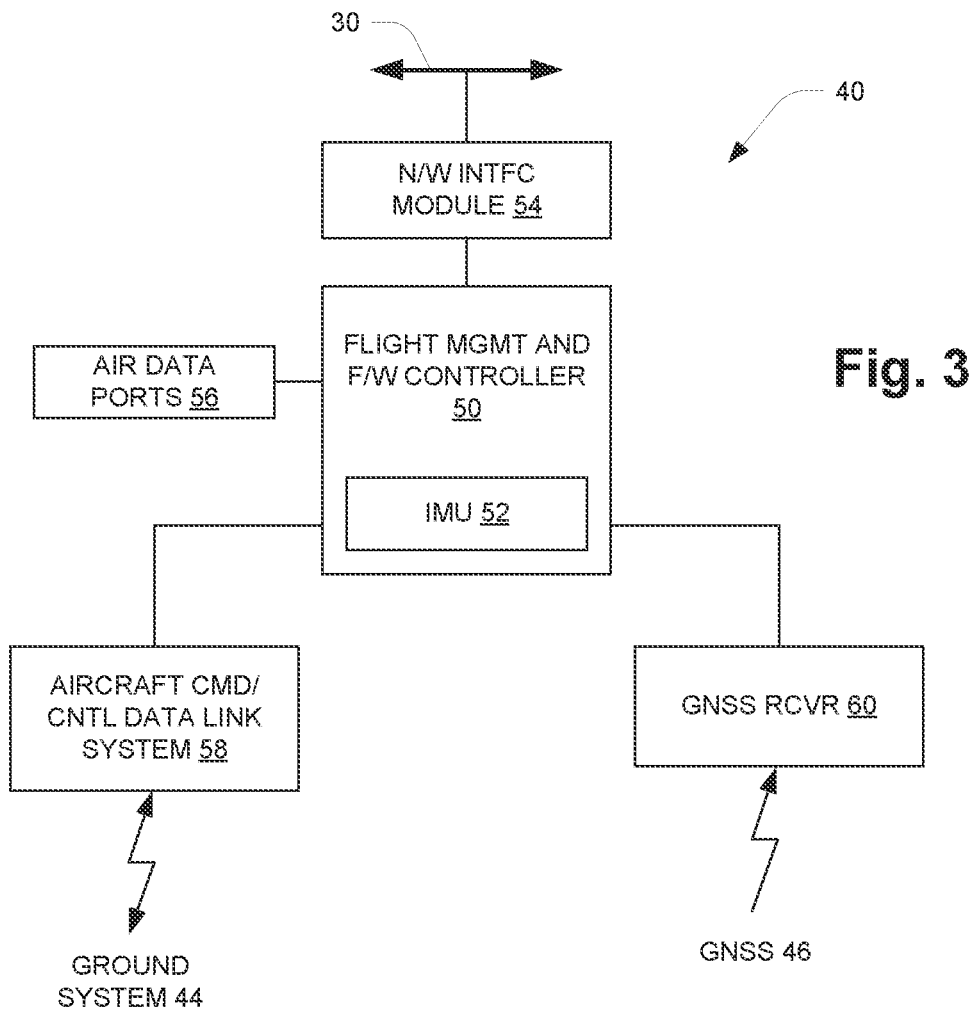
FIG. 3 is a schematic diagram of a flight management and fixed-wing control module.

FIG. 3 shows details of the flight management and F/W control module 40. The main component is a processor-based flight management and F/W controller 50 having its own inertial measurement unit (IMU) 52. The flight management and F/W controller 50, also referred to herein as the F/W controller 50, is connected to the aircraft network 30 by a network interface module 54, and has connections to air data ports 56, an aircraft command/control (CMD/CNTL) data link system 58, and a GNSS receiver 60 as shown. The F/W controller 50 includes processing circuitry and specialized firmware/software that is executed to realize the flight management and F/W control operation. As briefly mentioned above, one important aspect of the present arrangement is the ability to utilize a flight management and F/W control module 40 that has no knowledge of or adaptation to the presence of the separate VTOL control module 42, providing benefits such as relative ease of retrofit for incorporating VTOL operation into existing fixed-wing aircraft. As described more below, the VTOL control module 42 observes traffic on the aircraft network 30 to identify operational state of the aircraft and exert VTOL control accordingly.

Figure 4:
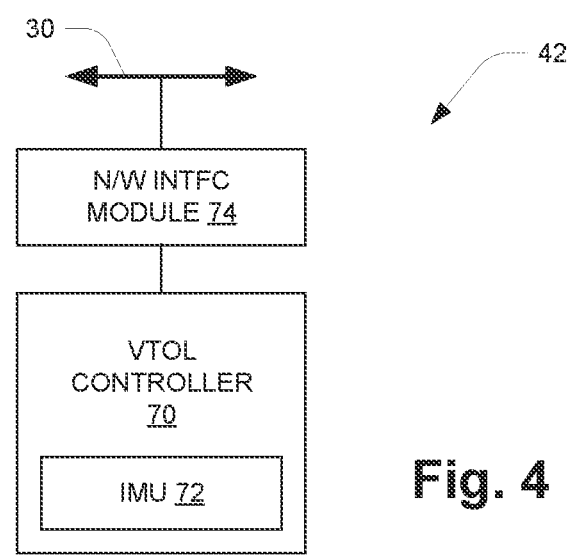
FIG. 4 is a schematic diagram of a vertical takeoff and landing (VTOL) control module.

FIG. 4 illustrates details of the VTOL control module 42. It includes a processor-based VTOL controller 70, which in the illustrated embodiment includes its own IMU 72, and a network interface module 74 providing connection to the aircraft network 30. The VTOL controller 70 includes processing circuitry and specialized firmware/software that is executed to realize VTOL operations as described herein. In one embodiment the VTOL controller 70 may be realized using certain open-source hardware known as Pixhawk®.

Although both the F/W controller 50 and VTOL controller 70 are shown as including respective IMUS 52, 72, in alternative embodiments the system may include a separate IMU providing navigation data to one or both controllers 50, 70. Alternatively, the VTOL controller 70 may use the F/W controller IMU 52.

Figure 5:
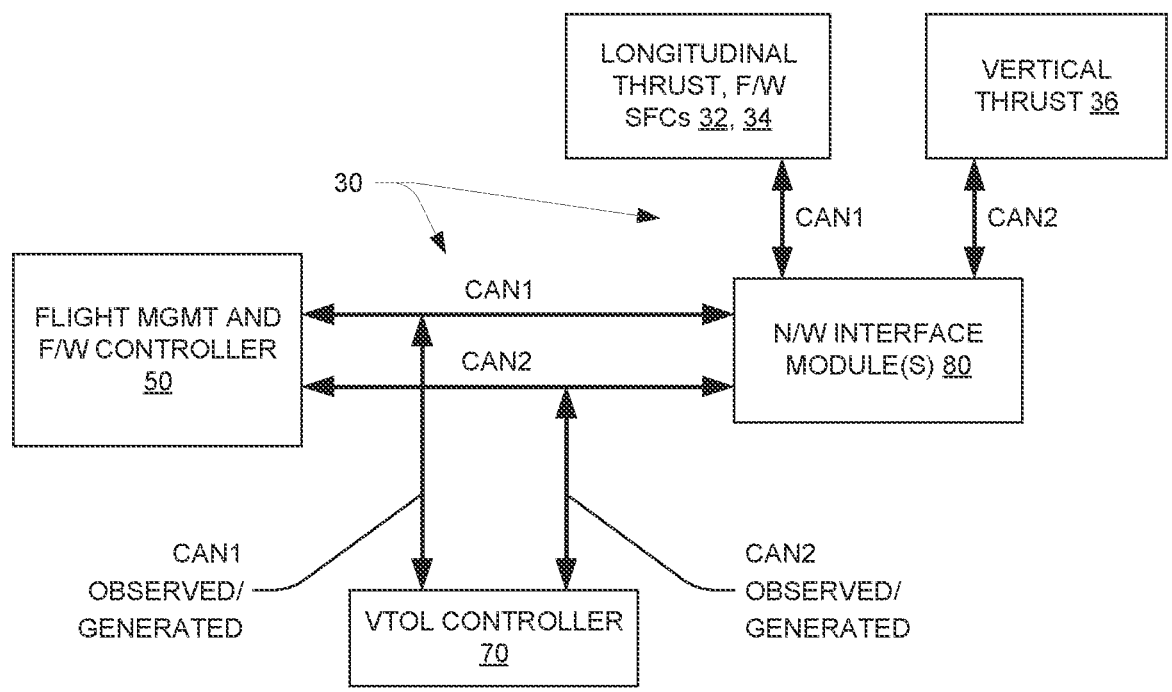
FIG. 5 is a schematic diagram depicting additional detail of the control arrangement.

FIG. 5 shows a more particular arrangement of the general scheme of FIGS. 2-4. The aircraft network 30 is realized by a collection of CAN Buses shown as CAN1 and CAN2, with connections as shown. In particular, the F/W controller 50 and the VTOL controller 70 are both connected to the same buses CAN1 and CAN2, and the components 32, 34 and 36 are reachable via CAN1 and CAN2 and a set of network interface modules 80 (e.g., hatch interface modules, wing interface modules). The VTOL controller 70 observes traffic on both CAN1 and CAN2, and also generates its own traffic on these buses as well. In one embodiment, these four different types of network traffic include the following:

1. Observed CAN1 traffic (generated predominantly by F/W controller 50)
   Autopilot (AP) State
   AP Mode
   Engine Kill State
   Launch Action(s)
   Brakes
   Commands/data specifically for VTOL controller 70 (insofar as supported by F/W controller 50)
2. Generated CAN1 traffic
   VTOL control module status, for consumption by F/W controller 50 (insofar as supported)
3. Observed CAN2 traffic (to and from F/W controller 50)
   F/W Stream Downlink
     GPS
     Air Data
     Altitude
     Launch/Touchdown points
   F/W Stream Uplink
     Waypoints/Mission Plans
     Operator Commands
4. Generated CAN2 traffic
   Vertical Lift Subsystem Status and Telemetry
   Control commands directed to components 32, 34 and 36 for controlling VTOL flight and transitions In the above, the indication "insofar as supported" refers to the possibility of the F/W controller 50 having awareness of the VTOL controller 70 and incorporating its presence into the overall flight management and control functionality. As noted, however, one benefit of the present arrangement is the ability to incorporate VTOL functionality into an existing F/W control scheme without requiring modification of the F/W controller 50.

Figure 6:
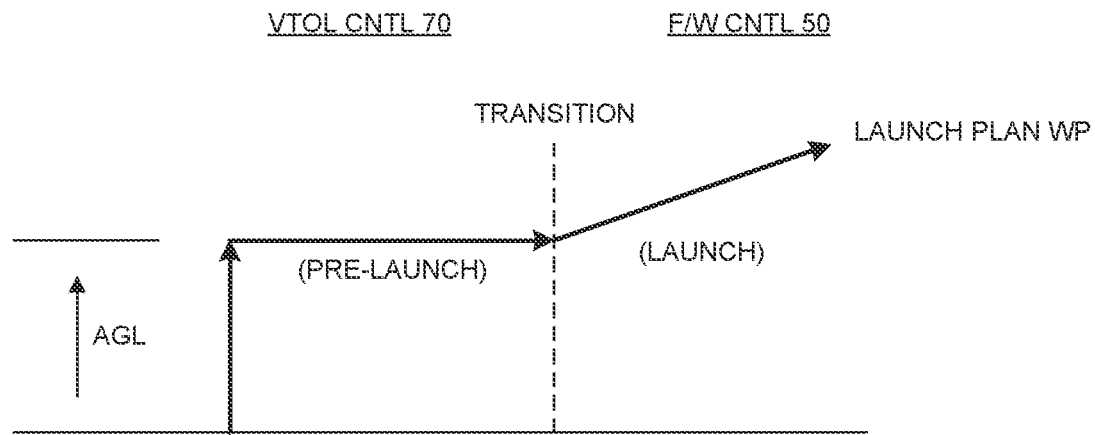
FIG. 6 is a schematic diagram describing takeoff/launch.

FIG. 6 is a schematic illustration of takeoff/launch, showing the transition or "hand-off" between VTOL control controller 70 and F/W controller 50. The VTOL controller 70 may be viewed as providing a "virtual launcher" to bring the aircraft 10 to fixed wing transition speed and then hand off to the F/W controller 50 once transition has been achieved. In particular, the VTOL controller 70 receives a discrete "launch" command and performs forward transition operation to cruise speed. When cruise speed is confirmed the VTOL controller 70 stows the lift kit motors. During the pre-launch period, the F/W controller 50 is commanding control surfaces to maintain level flight.

Figure 7:
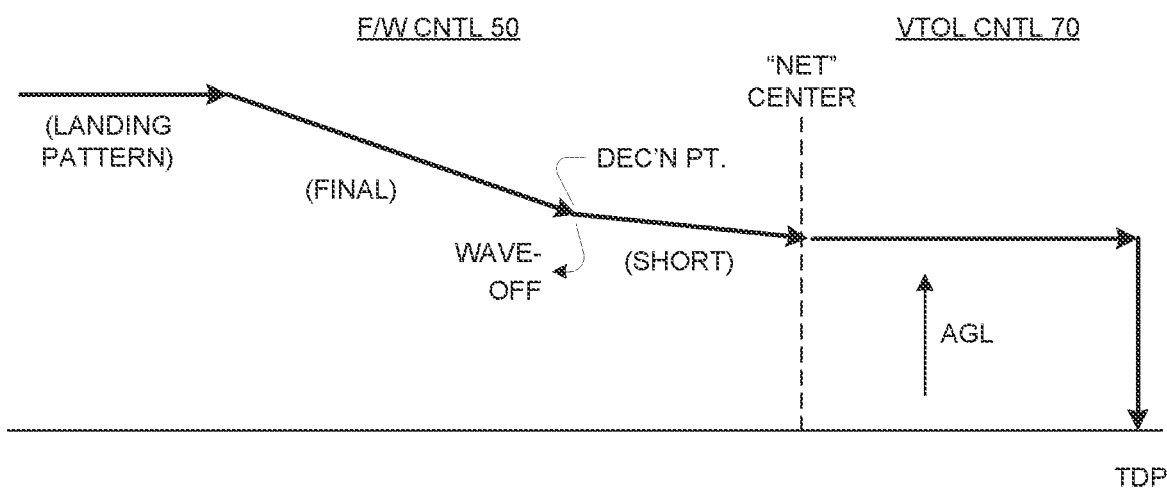
FIG. 7 is a schematic diagram describing landing/recovery.

FIG. 7 is a schematic illustration of landing/recovery. Here the VTOL controller 70 may be viewed as providing a "virtual net" to capture the aircraft 10 at the end of horizontal flight, shown here as including a final approach to a decision/wave-off point, followed by a short final to a point labelled "net" center. Operation transitions from the F/W controller 50 to the VTOL controller 70 at the moment of the "net" intercept, and the VTOL controller 70 manages the actual landing to a touch-down point (TDP). In typical use, the F/W controller 50 idles or completely cuts the horizontal engine 16 at the point of capture, but in some cases, such as testing or in connection with rolling landing/launch or touch-and-go maneuvers, the engine may be left running.

The landing/recovery operation depicted in FIG. 7 may be particularly useful for certain operating scenarios, such as a shipboard landing for example, whereas for other scenarios it may not be necessary. Thus in some embodiments a landing/recovery operation such as depicted in FIG. 7 may be altered to suit recovery location geometry and constraints or not be supported.

As noted above, in alternative embodiments some or all rotors 20 may be articulable in one or more directions, e.g., about a roll axis and/or pitch axis, and a technique known as "vectored thrust" may be used not only for VTOL operation but some or all of horizontal flight as well (i.e., the aircraft may or may not also include a dedicated horizontal-thrust engine and propeller 16).

While various embodiments of the invention have been particularly shown and described, it will be understood by those skilled in the art that various changes in form and details may be made therein without departing from the scope of the invention as defined by the appended claims.

What is claimed is:

1. A flight control arrangement for a hybrid aircraft capable of horizontal fixed-wing flight, vertical takeoff and landing (VTOL) flight, and transitions therebetween, comprising:
   a fixed-wing flight control module configured and operative to control the horizontal fixed-wing flight, the fixed-wing flight control module located in a first housing and having a respective first network interface connected to an aircraft data network via which the fixed-wing flight control module obtains sensory input and generates fixed-wing control network messages from the fixed-wing flight control module to network-connected fixed-wing flight components including one or more horizontal-thrust components; and
   a VTOL flight control module configured and operative to control the VTOL flight, the VTOL flight control module located in a separate second housing and having a respective second network interface connected to the aircraft data network, the VTOL control module providing add-on functionality in which it (1) observes flight status by monitoring the fixed-wing control network messages on the aircraft data network from the fixed-wing flight control module to the network-connected fixed-wing flight components, and (2) based on the observed flight status, generates VTOL control output to network-connected VTOL flight components including one or more vertical-thrust components,
   wherein the fixed-wing flight control module is further configured and operative as an independent agent without knowledge of the presence and involvement of the VTOL flight control module beyond indirect inertial observations.

2. The flight control arrangement of claim 1, wherein the aircraft data network includes a plurality of controller area network (CAN) buses each carrying respective network messages, including the control network messages, originated by the fixed-wing flight control module and VTOL flight control module.

3. The flight control arrangement of claim 2, wherein the network messages originated by the fixed-wing flight control module include autopilot messages conveying autopilot state and autopilot mode of an autopilot function of the fixed-wing flight control module, and wherein the VTOL flight control module is further operative to monitor the autopilot messages and incorporate the autopilot state and autopilot mode into the flight status on which the VTOL control output is based.

4. The flight control arrangement of claim 3, wherein the network messages originated by the fixed-wing flight control module further include data messages conveying a stream downlink to a ground control system including global positioning system (GPS) data, air data, altitude data, and launch/touchdown points, and wherein the VTOL flight control module is further operative to monitor the data messages and incorporate the GPS data, air data, altitude data and launch/touchdown points into the flight status on which the VTOL control output is based.

5. The flight control arrangement of claim 4, wherein the network messages include messages conveying a stream uplink from the ground control system including waypoints/mission plans and operator commands.

6. The flight control arrangement of claim 2, wherein the network messages originated by the VTOL control module include messages conveying vertical lift subsystem status and telemetry, and control commands directed to the fixed-wing flight components and VTOL flight components for controlling VTOL flight and transitions between VTOL and fixed-wing flight.

7. The flight control arrangement of claim 1, further configured and operative to perform a takeoff/launch operation in which the VTOL control module performs a virtual launcher function to bring the aircraft to fixed-wing transition speed and then hands off flight control to the fixed-wing control module once transition has been achieved.

8. The flight control arrangement of claim 7, wherein the fixed-wing control module is further configured and operative to command control surfaces to maintain level flight during the virtual launcher function of the VTOL control module.

9. The flight control arrangement of claim 1, further configured and operative to perform a landing/recovery operation in which the VTOL control module performs a virtual net function to capture the aircraft at the end of horizontal flight at a capture point, and wherein flight operation transitions from the fixed-wing control module to the VTOL control module at a virtual net intercept.

10. The flight control arrangement of claim 9, wherein the horizontal-thrust components are idled or completely cut at the capture point.

11. The flight control arrangement of claim 9, wherein the horizontal-thrust components remain running at the point of capture, for testing or for rolling land/launch operation.

12. The flight control arrangement of claim 1, wherein the vertical-thrust components include vertically oriented rotors.

13. The flight control arrangement of claim 12, wherein the rotors are fixed-position rotors and the VTOL control module is further configured and operative to provide control signals to the horizontal-thrust components during takeoff to bring the aircraft to a speed for transitioning to fixed-wing flight.

14. The flight control arrangement of claim 12, wherein the rotors are variable-position rotors used by the VTOL controller to provide vectored thrust having both a horizontal component and a vertical component.

15. The flight control arrangement of claim 14, wherein the variable-position rotors serve as the horizontal-thrust components in addition to the vertical-thrust components.

16. The flight control arrangement of claim 14, wherein the horizontal-thrust components include a fixed-position horizontal-thrust engine.

17. The flight control arrangement of claim 1, wherein:
the fixed-wing flight control module includes a (1) flight management and fixed-wing controller and (2) a global navigation satellite system (GNSS) receiver, the flight management and fixed-wing controller having the first network interface to the aircraft network and having a separate second connection to the GNSS receiver to receive position data therefrom, and
the flight management and fixed-wing controller generates the fixed-wing control network messages and sends them to the network-connected fixed-wing flight components via the first network interface and the aircraft network, and the VTOL control module monitors the fixed-wing control messages on the aircraft network via the second network interface to obtain the observed flight status and generate the VTOL control output based thereon.

18. The flight control arrangement of claim 17, wherein the fixed wing controller is unmodified from a non-VTOL fixed wing aircraft configuration, and the flight control arrangement is a field retrofit of an existing fixed wing aircraft.

19. A method of providing flight control in a hybrid aircraft capable of horizontal fixed-wing flight, vertical takeoff and landing (VTOL) flight, and transitions therebetween, comprising:
operating a fixed-wing flight control module to control the horizontal fixed-wing flight, the fixed-wing flight control module located in a first housing and having a respective first network interface connected to an aircraft data network, the fixed-wing flight control module using the aircraft data network to obtain sensory input and generate fixed-wing control network messages from the fixed-wing flight control module to network-connected fixed-wing flight components including one or more horizontal-thrust components; and
operating a VTOL flight control module to control the VTOL flight, the VTOL flight control module located in a separate second housing and having a respective second network interface connected to the aircraft data network, the VTOL flight control module providing add-on functionality including (1) observing flight status by monitoring the fixed-wing control network messages on the aircraft data network from the fixed-wing flight control module to the network-connected fixed-wing flight components, and (2) based on the observed flight status, generating VTOL control output to network-connected VTOL flight components including one or more vertical-thrust components,
wherein the fixed-wing flight control module is further configured and operative as an independent agent without knowledge of the presence and involvement of the VTOL flight control module beyond indirect inertial observations.

\* \* \* \* \*